Aug. 26, 1941.   H. F. WATERS   2,253,946
CLOSING APPARATUS
Filed Jan. 26, 1938
Fig. 2.
Fig. 1.
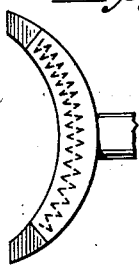
Fig. 3.
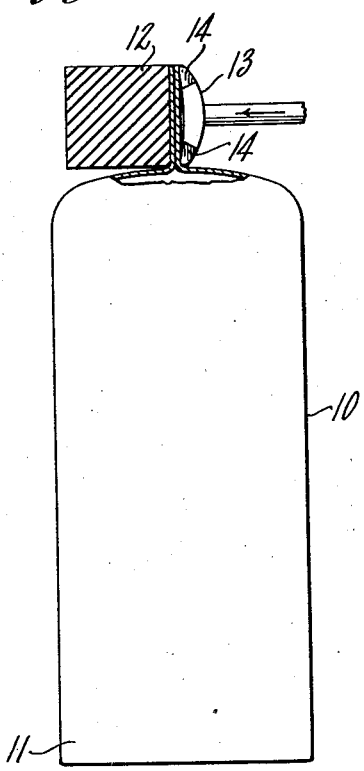
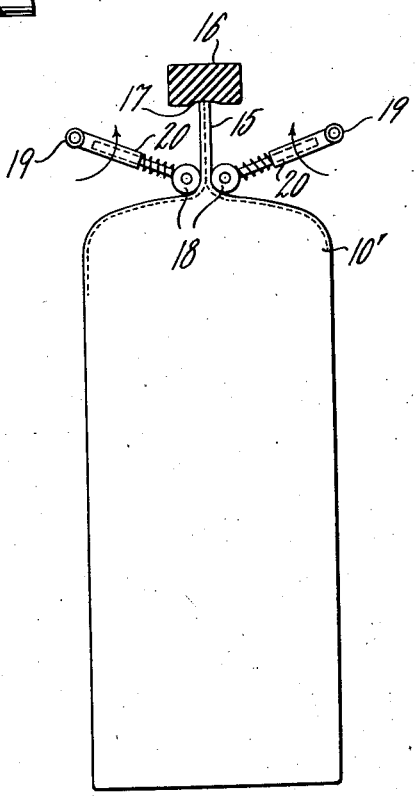
Fig. 4.
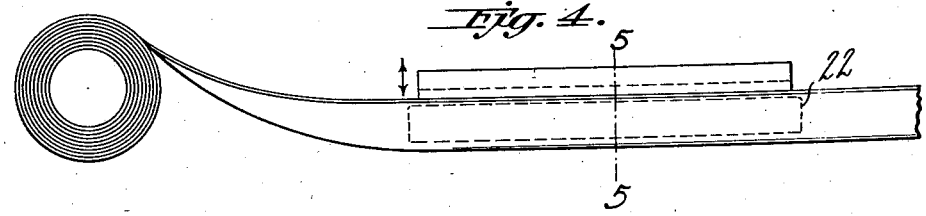
Fig. 5.
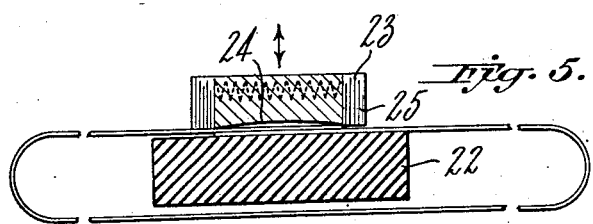
INVENTOR
HARRY F. WATERS
BY
*Frank Jorley Jr*
ATTORNEY Patented Aug. 26, 1941

2,253,946

UNITED STATES PATENT OFFICE 2,253,946

CLOSING APPARATUS

Harry F. Waters, New York, N. Y.

Application January 26, 1938, Serial No. 186,958

3 Claims. (Cl. 154—42)

This invention relates to improvements in making bags and similar containers from thermoplastic material or from material provided with a thermoplastic coating, and, more particularly to an improved apparatus for controlling the flow of the thermoplastic material in order to insure the formation of a seam or seal of uniform width. The invention is particularly applicable to the formation of closures for bags after the latter have been filled, although the principles of the invention may be employed in the bag making processes such as the bag tubing and bottoming operations, as will hereinafter more fully appear.

One of the chief features of the present invention is to provide an improved apparatus for forming a closure for a bag or similar container made from thermoplastic material, or from a material provided with a thermoplastic coating, wherein the flow of the thermoplastic material is controlled during the application of heat thereto to the end that a seam or seal of uniform width is formed. The apparatus is so designed as to prevent the formation in the seam or seal of local areas which contain no thermoplastic material. If ordinary heat sealing apparatus were employed there would be no means of preventing the removal of all of the thermoplastic material at one or more points along the seam.

Another feature of this invention resides in the provision of an improved apparatus of the type above discussed in which means are provided to direct and control the flow of the thermoplastic material as desired when the open end of the bag is being closed. These and other features of the invention will become more apparent in a reading of the following description and with reference to the accompanying drawing in which like numerals indicate like parts and in which Fig. 1 is a view in side elevation showing the manner in which the closure is formed;

Fig. 2 is an enlarged view of the heat sealing element;

Fig. 3 is a view similar to Fig. 1, but showing a modified form of closing apparatus;

Fig. 4 is a diagrammatic view showing the manner in which my improved method and apparatus may be used in the bag forming operation and in particular to the tubing operation; and Fig. 5 is a sectional view taken along the lines 5—5 of Fig. 4.

Referring now to the drawing and more particularly to Fig. 1, there is shown a bag 10 containing any desired commodity 11 in operative position with respect to the closure forming unit. As has hereinbefore been described, the bag or container may be made of thermoplastic material or it may comprise some material as, for example, any suitable paper coated with a thermoplastic material. Since many types of thermoplastic materials may be used, I do not wish to limit the invention necessarily to any particular type of material. In practice, however, I prefer to use some thermoplastic material such as rubber hydrochloride, or analagous rubber material, although thermoplastic materials made from proteins, artificial resins and the like may be employed. The heat sealing unit comprises a backing member 12 preferably formed of some resilient material as, for example, rubber. The bar 13 is connected to a suitable source of energy which will heat the body portion thereof facing the wall of the bag and constituting the operating face of the bar 13. In some instances the element may be provided with a concave face, the remainder thereof being of any desired form or shape. In order to prevent the ends 14 of this element or bar from burning the walls of the bag they are insulated from the heated section of the element. In operating the unit, relative movement is created between the backing element and the bar 13 by any suitable means (not shown). Since the bar 13 is heated and the bag mouth is positioned between this member and the backing member, pressure created will cause a flow of the thermoplastic material from which the bag is formed so that the mouth 15 of the bag is sealed. If a coated material is used a similar action on the coating will occur. The concave portion of the heating element insures the provision of a seam of uniform width since, when the heating element forces the walls of bag against the rubber backing bar, that area of the walls of the bag being sealed will assume the general configuration of the concave portion of the heating element 13 and due to the fact that the ends 14 thereof are insulated, these ends, particularly the lower one, will form a dam which will prevent the flowing of the thermoplostic material beyond the point of contact of the insulated section with the walls of the bag. In this way the thermoplastic material is heated in a predetermined area so that there is no danger of the escape of the thermoplastic material from within this area during the sealing operation. Accordingly, a sufficient amount of the thermoplastic material to insure the formation of a tight seam or joint will be maintained within the area heated by the bar 13.

Referring now to Fig. 3 there is shown a modified form of apparatus. In this figure the open mouth 15' of the bag 10' is subjected to the action of a heat sealing unit of slightly modified construction. In this modification there is provided a dam 16 having a concave operating surface 17. This dam may, and preferably is, made of some resilient material as, for example, rubber. The heating bars 18 are secured to shafts 19 by means of levers 20 which are rigidly secured to the shafts. Each of the bars 18 is connected in any suitable manner to a source of heat such as, for example, an electrical current. When the shafts are rotated the elements 18 will be forced against both walls of the bag and at the same time will move upwardly toward the dam 16 so that the thermoplastic material tends to flow toward the dam. In this manner the flow of the thermoplastic material is at all times controlled. This modified form of apparatus is particularly adaptable in forming a closure for a bag provided with conventional gussets or with a plurality of gussets. Such a bag will contain a plurality of folds and the increasing pressure of the heating elements against the walls of the bag during their travel toward the dam 16 will insure the application of a sufficient amount of heat to all of the folds of the bag so that a tight seam is formed throughout various thicknesses in the mouth of the bag.

As will be appreciated the features of the invention just described may be utilized in the bag making processes and in Figs. 4 and 5 I have illustrated one manner of their application to the tube-forming step of the bag making process. In accordance with standard practices the material from which the bag is formed is led over a former plate which forms the material into a tube and overlaps the longitudinal edges of the material. Instead of applying adhesive to the longitudinal edges of the material before they are overlapped I can, by my present invention, dispense with this step and seal the overlapped edges together merely by the application of heat and pressure. Accordingly I have provided a backing member 22 made of rubber or the like, positioned below the overlapped longitudinal edges of the material. As the overlapped edges pass between the backing member 22 and a heating element 23, the heating element is forced downwardly against the backing member causing a flow of thermoplastic material in the area of the overlapped edges so that the tube may be seamed without the necessity of using adhesive. In order to prevent an undue flow of the thermoplastic material and in order to confine the seaming operation to the seam proper, I have provided a heating element 23 with a concave surface 24, the ends 25 thereof being properly insulated so as to prevent the passage of heat therethrough. In this way the ends serve as dams which prevent the flow of the thermoplastic material beyond the area to be seamed. In the operation of the heating unit just described, it is desirable to employ a step heating operation, that is, the heating element is reciprocated in any suitable manner and the material from which the bag is to be made travels between the heating element 23 and the backing element 22 in timed relation to the reciprocatory movement of the heating element 23. Such operation, however, will not materially reduce the speed of operation of the bag machine since the heating element 23 may be rapidly reciprocated and the amplitude of each reciprocation may be maintained very low since all that is required is to move the heating element away from the backing bar sufficiently to allow the material to be drawn to the new heat sealing position. The length of travel of the tube between each heat applying operation is less than the length of the tube sealed during each heat applying operation.

From the above description it will be appreciated that I have provided an improved apparatus for employing heat sealing principles to form a satisfactory closure for bags or other containers and it will be further appreciated that the principles of my invention are not restricted merely to the formation of a closure since from a consideration of Figs. 4 and 5, the invention may readily be applied to the tube forming step in standard bag making practice. Any standard control means to regulate the temperature of the heating elements can be used. Moreover, the invention may also be applied to the bottoming step in standard bag making practice. Accordingly, the invention is susceptible of many modifications and variations without in any way departing from the spirit or scope of the invention as hereinafter defined in the appended claims which are to be broadly construed.

I claim:

1. In a device for heat-sealing thermoplastic material, a backing member made of yieldingly resilient material and presenting a normally planar working face; and an elongated heatable element comprising a concave working face terminating in insulated marginal edge portions, said heatable element being adapted to be pressed against the material to be sealed and against said backing member to apply greatest pressure upon said thermoplastic material at said insulated edge portions, thereby defining a zone between said edge portions, and including means to apply heat at gradually decreasing pressure to that portion of said thermoplastic material within said zone, whereby to confine the fused thermoplastic material to said zone.

2. In a device for forming heat-sealed seams between superposed thermoplastic surfaces of a flexible material by fusion of thermoplastic material forming said surfaces, a backing element presenting a normally planar yieldingly resilient working face; an elongated heatable element having a concave working face; and means for heating said heatable element to heat-sealing temperature within the central regions of its working face and to a temperature below heat-sealing temperature at the longitudinal edge portions of its working face, said elements being adapted to be pressed against thermoplastic material interposed therebetween to apply lower temperature at greater pressure to the regions of said thermoplastic material exposed to said longitudinal edge portions, thereby defining a predetermined zone between said edge portions, and heat-sealing temperature at lower pressure to said thermoplastic material within said zone, whereby to confine the fused thermoplastic material to said zone.

3. In a tubing device for a machine adapted to form bags from a web of material presenting at least one thermoplastic surface, the combination of means to bring thermoplastic marginal edge portions of said web into superposed relation to form a tube; and means to heat-seal said superposed edge portions comprising a backing member made of yieldingly resilient material and presenting a normally planar working face, an elongated heatable element comprising a concave working face terminating in insulated marginal edge portions, said heatable element being adapted to be pressed into engagement with successive lengths of the superposed marginal portions of said web and against said backing member to apply greatest pressure upon that portion of each successive length of web exposed to said insulated edge portions, thereby defining a predetermined zone between said edge portions, and including means to apply heat and gradually decreasing pressure to that portion of the web within said zone whereby to confine the fused thermoplastic material to said zone.

HARRY F. WATERS.